Aug. 6, 1935.    J. W. SMITH    2,010,499
BEARING SEAL
Filed Dec. 9, 1932
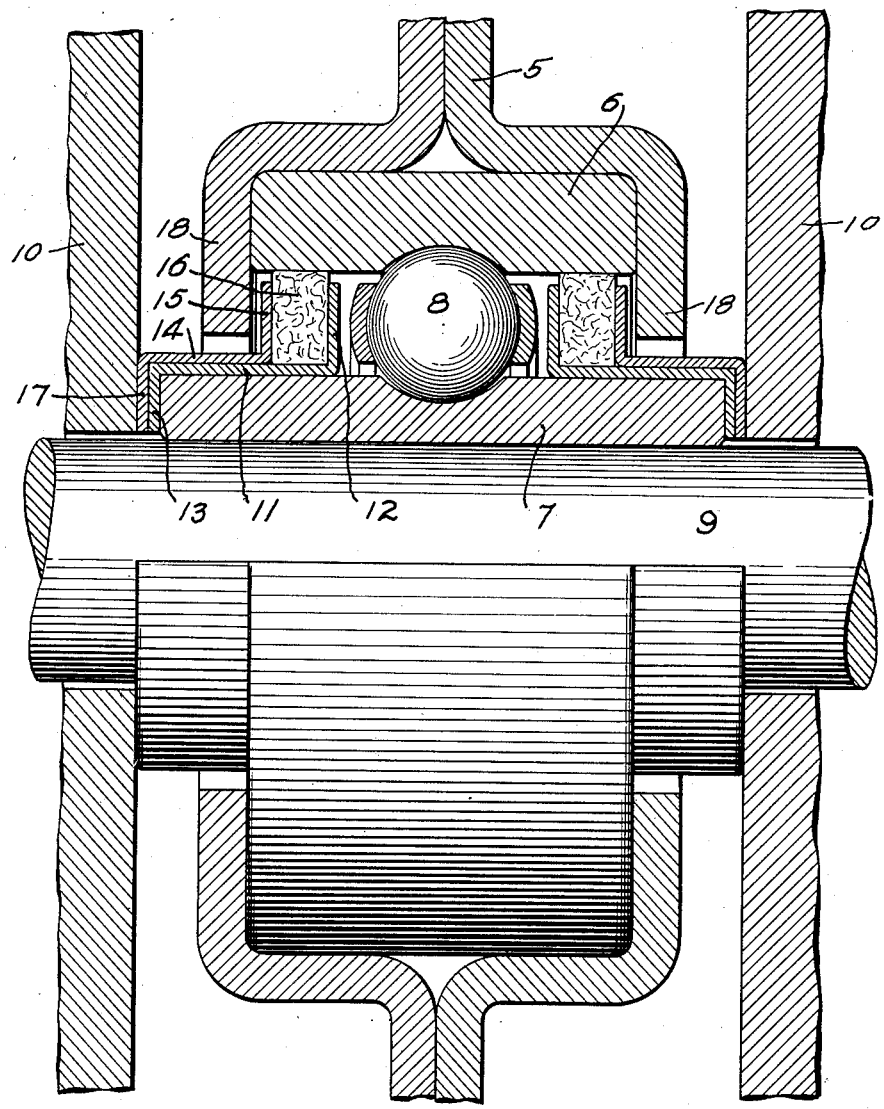
INVENTOR
JOHN W. SMITH
BY
*Mitchell & Biehurt*
ATTORNEYS.

Patented Aug. 6, 1935

2,010,499

UNITED STATES PATENT OFFICE 2,010,499

BEARING SEAL

John W. Smith, New Britain, Conn., assignor to The Fafnir Bearing Company, New Britain, Conn., a corporation of Connecticut Application December 9, 1932, Serial No. 646,369

6 Claims. (Cl. 286—5)

My invention relates to a bearing device and more particularly to seal means.

In various bearing seals heretofore in use, there is considerable likelihood that the seals may pop out or become disengaged from the ring carrying the seal.

It is an object of my invention, therefore, to provide a bearing seal which in certain applications may be arranged against any possibility of becoming disengaged from its bearing ring.

It is a further object to provide a generally improved and simplified bearing seal.

The drawing shows, for illustrative purposes only, one embodiment of the invention and illustrates a bearing in quarter section. The particular embodiment illustrates a rocker arm construction for engines, though the invention is, of course, not limited to that particular application.

5 indicates a rocker arm or the like which is in two parts and may be assembled endwise over the outer bearing ring 6 of an anti-friction bearing, including the outer ring 6 and inner ring 7, and interposed anti-friction bearing members such as balls 8. The inner ring 7, which in the preferred form is longer than the outer ring 6 and extends axially beyond each edge thereof, may be carried by a bolt or shaft 9, which in the present embodiment would be non-rotatable in use. The shaft 9 is suitably supported at the ends by means not shown which may constitute part of a frame or support, side portions 10—10 of which are illustrated.

The bearing shown is sealed at each side by means of duplicate seals illustrative of the invention. In that particular form shown, there is a sheet metal sleeve 11 preferably tightly fitting over the face of the inner ring 7 and is provided with an outwardly radially extending flange 12 between the inner and outer bearing rings. The sleeve 11 is also provided at its outer end with an inwardly radially extending flange 13 abutting the edge face of the inner ring 7. A second and shorter sleeve 14 fits tightly on the sleeve 11 and is provided between the bearing rings with a radially outwardly extending flange 15 spaced from the flange 12 and forming therewith a holding space or recess for a seal ring such as the felt washer 16. The felt washer is thus supported between the flanges 12 and 15 and rides upon the outer surface of the sleeve 11 and the inner face of the outer ring 6. The sleeve 14 is preferably provided on its outer end with a radially inwardly extending flange 17 extending over the flange 13.

As a seal device, the above described seal is very effective and is exceedingly cheap to manufacture and simple to assemble. In such applications where the particular construction admits, a suitable support 10 abuts the flange such as 17 so that there can be no possibility of the seal becoming displaced from the bearing. Furthermore, in the illustrated embodiment, the rocker arm 5 has inwardly directed flanges 18—18 which would prevent accidental outward displacement of the seal.

While the invention has been described in considerable detail and one application illustrated, it is to be understood that changes may be made within the scope of the invention as defined in the appended claims.

I claim:

1. In an anti-friction bearing comprising inner and outer bearing rings and anti-friction bearing members interposed between said bearing rings, seal means for sealing the space between said bearing rings and comprising a sleeve fitting the face of one of said rings and extending inwardly between the opposed faces of said rings, said sleeve having a radially extending flange thereon, a second sleeve fitting said first mentioned sleeve and having a radially extending flange thereon spaced from said first mentioned flange, a seal ring interposed between said radial flanges and between one of said sleeves and the face of the opposite bearing ring, said sleeves at the ends opposite said first mentioned flanges having radial flanges extending over the edge face of one of said rings.

2. In an anti-friction bearing comprising inner and outer bearing rings with interposed anti-friction bearing members, seal means comprising a sleeve member having oppositely extending radial flanges at opposite ends thereof, one of said flanges being interposed between the bearing rings while the other of said flanges extends over the edge face of one of said rings, said sleeve fitting on the bearing face of one of said rings, a seal ring positioned by said flange between said bearing rings, and means for holding said seal ring in place.

3. In an anti-friction bearing comprising inner and outer bearing rings with interposed anti-friction bearing members, said inner ring being of greater width than said outer ring, a bearing seal including a part interposed between the opposed bearing faces of said rings for sealing the radial space therebetween, said seal including a part extending over the outer edge face of said inner ring, and means abutting said part to hold said seal in place.

4. In an anti-friction bearing comprising inner and outer bearing rings with interposed anti-friction bearing members, seal means for sealing the space between said bearing rings and comprising a plurality of members in the space between opposed bearing faces of said bearing rings, one of said members serving to bodily carry all of the other members of said seal means, one of said members having a part extending over the edge face and over the bearing face of one of said bearing rings to position said seal means on said ring.

5. In an anti-friction bearing comprising inner and outer bearing rings with interposed anti-friction bearing members, seal means carried by one of said rings and comprising a pair of concentric interfitting sleeves carried by one of said rings on the bearing face thereof, one of said sleeves having a radial flange extending over the outer edge face of the ring carrying the same, one of said sleeves having a radial flange at the inner end thereof and in the space between opposed bearing faces of said bearing rings.

6. In an anti-friction bearing comprising inner and outer bearing rings with interposed anti-friction bearing members, a seal member comprising a sleeve fitting the outer bearing face of said inner ring, an inwardly directed flange on said sleeve and abutting the edge face of said inner ring, said sleeve extending into the space between said rings and having an outwardly directed flange extending into close proximity to the bearing face of said outer bearing ring.

JOHN W. SMITH.